(12) United States Patent
Singh et al.

(10) Patent No.: US 12,136,112 B2
(45) Date of Patent: Nov. 5, 2024

(54) RECOMMENDING THE MOST RELEVANT CHARITY FOR A NEWS ARTICLE

(71) Applicant: MASTERCARD INTERNATIONAL INCORPORATED, Purchase, NY (US)

(72) Inventors: Shreyansh Singh, Noida (IN); Gaurav Dhama, Gurgaon (IN); Ankur Arora, New Delhi (IN); Kanishka Kayathwal, Kota (IN); Jessica Carta, Stamford, CT (US); Ganesh Nagendra Prasad, West New York, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 608 days.

(21) Appl. No.: 17/401,048

(22) Filed: Aug. 12, 2021

(65) Prior Publication Data
US 2023/0051764 A1    Feb. 16, 2023

(51) Int. Cl.
| G06Q 30/02 | (2023.01) |
| G06F 16/24 | (2019.01) |
| G06F 16/2457 | (2019.01) |
| G06F 18/21 | (2023.01) |
| G06F 18/22 | (2023.01) |
| G06F 40/20 | (2020.01) |
| G06F 40/284 | (2020.01) |
| G06F 40/30 | (2020.01) |
| G06Q 30/0279 | (2023.01) |

(52) U.S. Cl.
CPC ..... *G06Q 30/0279* (2013.01); *G06F 18/2178* (2023.01); *G06F 18/22* (2023.01); *G06F 40/284* (2020.01); *G06F 40/30* (2020.01)

(58) Field of Classification Search
USPC ............ 382/100–103, 154–253; 704/1–275; 706/1–62, 900–903; 707/705–800
See application file for complete search history.

(56) References Cited

U.S. PATENT DOCUMENTS

| 10,636,062 | B1 * | 4/2020 | Mossoba ............ G06Q 30/0279 |
| 11,682,226 | B2 * | 6/2023 | van Rotterdam .... G06V 30/416 |
| | | | 382/218 |
| 2015/0379591 | A1 * | 12/2015 | Massarik ............... G06Q 40/10 |
| | | | 705/7.39 |
| 2016/0358094 | A1 * | 12/2016 | Fan ................... G06F 16/24578 |
| 2017/0169445 | A1 * | 6/2017 | Shuken .................. G06Q 20/10 |
| 2022/0067799 | A1 * | 3/2022 | Soderstrom ...... G06Q 20/40155 |
| 2022/0215443 | A1 * | 7/2022 | Soderstrom ........ G06Q 20/3224 |

* cited by examiner

*Primary Examiner* — Marcellus J Augustin
(74) *Attorney, Agent, or Firm* — Pillsbury Winthrop Shaw Pittman LLP

(57) ABSTRACT

The disclosure relates to AI-based machine-learning and natural language modeling to identify semantic similarities between sets of content having natural language text. For example, a system may generate a relevance classification that indicates whether content such as articles are non-specifically relevant to charities without identifying a particular charity. If the content is non-specifically relevant to charities, the system may apply a natural language model to generate sentence embeddings based on the content and determine a level similarity between the sentence embeddings and a query embedding generated from a charity query. The charity query may itself be generated from a full description of the charity through an encoder-decoder architecture with reinforcement learning.

20 Claims, 10 Drawing Sheets

RECOMMENDING THE MOST RELEVANT CHARITY FOR A NEWS ARTICLE

BACKGROUND

As content continues to trend toward electronic media, there is a massive quantity of content made available through websites and other electronic channels like electronic mail, social media posts, and the like. Oftentimes the content may include subject matter that engenders a desire to donate to specific causes such as charities. However, doing so may be cumbersome and difficult. Due to the quantity and other issues with the content, it may be difficult to automate charitable giving at the moment that willingness to make such a donation is triggered.

BRIEF DESCRIPTION OF THE DRAWINGS

Features of the present disclosure may be illustrated by way of example and not limited in the following figure(s), in which like numerals indicate like elements, in which.

DETAILED DESCRIPTION

Figure 1:
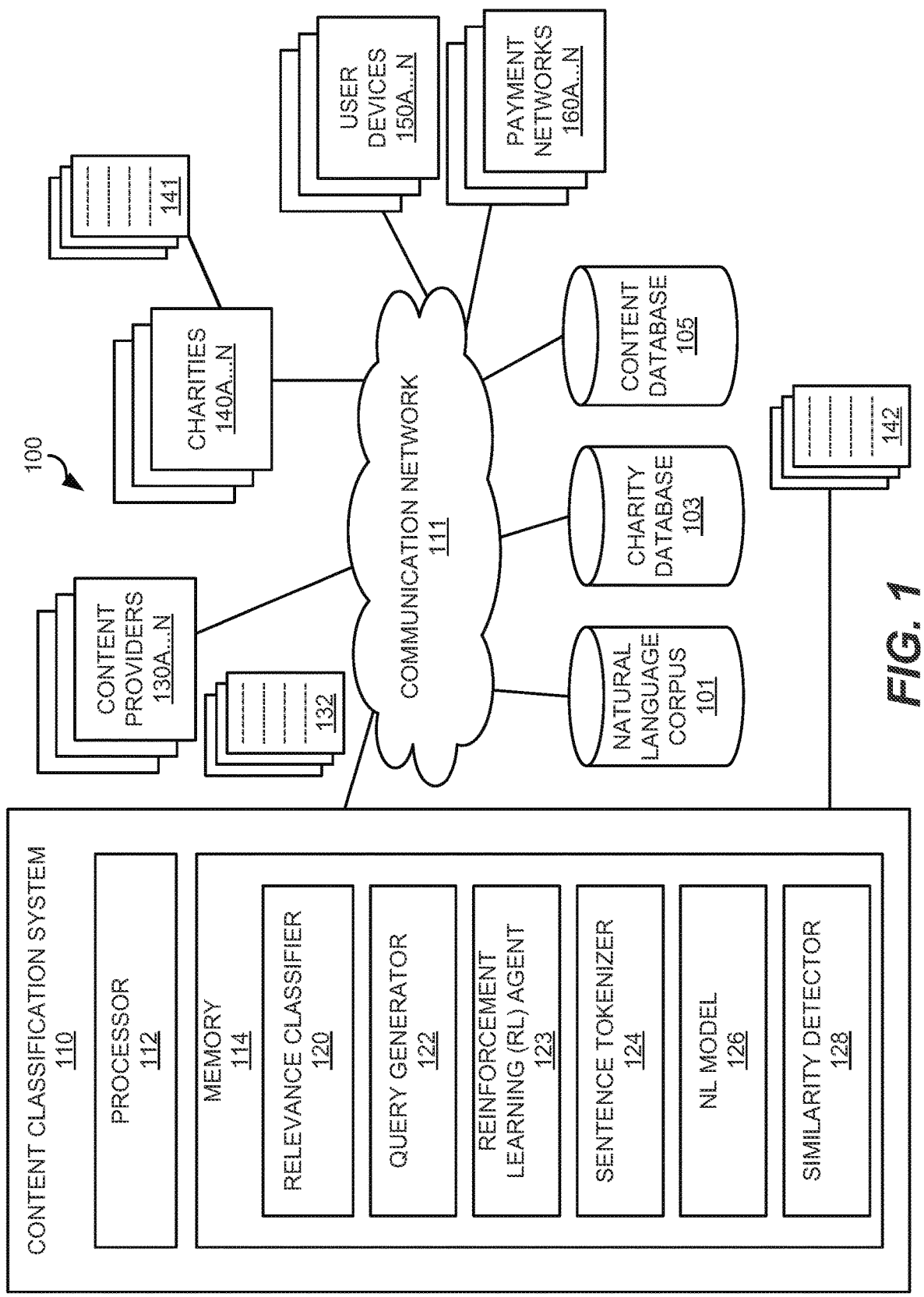
FIG. 1 illustrates an example of a system environment that includes a content classification system that generates and executes natural language computational models and machine-learning models to identify charities that are relevant to content such as articles.

The disclosure herein relates to machine-learning and natural language modeling to identify semantic similarities between sets of content having natural language text. For purposes of illustration, in various examples that follow, machine-learning and natural language modeling may be described in the context of identifying charities that are relevant to articles (or vice versa) based on semantic similarity between natural language text in charity queries and natural language text in content such as articles. Identified charities may be recommended for donation and the recommendation may be transmitted with the article. The recommendation may be transmitted with a callback network interface that may initiate a payment request to a payment network via a communication network. In this manner, users may donate to the identified charity after reading the article. More generally, the disclosure may relate to training, validating, and using machine-learning and natural language modeling to identify semantic similarity among various types of content. For example, content may relate to a description of a product or service and the system may identify other products or services that may be relevant to the product or service based on the machine-learning and natural language modeling described herein.

Semantic similarity may refer to similarity of the words, structure (such as order) of words, and/or other linguistic characteristics between content having natural language text. The term "natural language" may refer to linguistically arranged words or phrases that convey meaning. Typically, natural language text includes words arranged into sentences. Natural language modeling may refer to machine-learning-based computational processing that enable a computer system to understand the meaning conveyed by natural language text through quantitative representations of the text.

Various issues may arise when attempting to computationally determine similarity between natural language text in different content. For example, a computational scaling problem may exist when there is a massive amount of content to analyze, data overfitting and analysis of irrelevant data may arise when natural language text includes extraneous information that is irrelevant for purposes of similarity detection, and it may be problematic to enable a computer system to understand similarity between natural language text that is intended for qualitative understanding by humans. The foregoing examples of the various issues that may arise will be described in the context of identifying charities that are relevant to content such as articles by computationally analyzing natural language text in charity descriptions and natural language text in the articles.

In some examples, in order to mitigate the computational scaling problem, the content classification system may filter the content based on a relevance classifier trained to identify whether or not the content is non-specifically relevant to charities generally. In other examples, such filtering may not be performed. When performed, content that is determined to be non-specifically relevant to charities may be further processed to identify one or more specific charities that are relevant to the content.

In some examples, in order to address data overfitting or underfitting because of extraneous text in charity descriptions, the content classification system may generate a charity query from a charity description. For example, the content classification system may perform extractive and/or abstractive summarization of the charity description to generate the charity query. In some examples, the content classification system may include an encoder-decoder architecture that generates the charity query based on the charity description and a generation policy. The generation policy may be refined through reinforcement learning ("RL"). The RL may be informed by feedback via a RL feedback agent that monitors feedback indicating whether charities identified by the content classification system as being relevant to content were deemed by users to be relevant. For example, the feedback may include an indication that a user donated to a charity identified as being relevant to content, an express positive or negative indication of relevance from the user without a donation, and/or other type of feedback.

In some examples, in order to address the computational difficultly in analyzing natural language text originally developed for qualitative human comprehension, the content classification system may use a natural language model ("NL model") trained on a corpus of natural language text to generate semantic representations of natural language text. The semantic representations may include quantitative encodings that a processor of the content classification system may computationally analyze. For example, the semantic representations may include sentence embeddings that are vectors of real numbers that represent the words and structure of words in sentences from the content in an embedding space determined from the corpus of natural language text. The same NL model may be used to generate one or more sentence embeddings for the charity query. Thus, because the same embedding space is used, the sentence embeddings from the content may be compared to one or more sentence embeddings of the charity query. Such comparison may use vector similarity comparisons to quantitatively determine a level of similarity between the sentence embeddings of the content and sentence embeddings of a charity query. When the level of similarity exceeds a threshold level of similarity, the charity may be determined to be relevant to the content.

Having described an overview of various system operations, attention will now turn to a description of an example of a system environment to identify semantic similarities between natural language text of content and natural language text of charities. For example, FIG. 1 illustrates an example of a system environment 100 that includes a content classification system 110 that identifies charities 140 relevant to content 132 such as news or other types of articles based on semantic similarities between the natural language text in the content 132 and the natural language text in charity queries 142, which are based on charity descriptions 141 of the charities 140. As used herein, a charity query 142 (and its corresponding charity 140) may be "relevant" to content 132 if the content 132 engenders a willingness to donate to the corresponding charity 140. Such relevance may be quantified through similarity scores described herein and may be assessed for accuracy based on feedback from users.

The system environment 100 may include, among other things, a natural language corpus 101, a charity database 103, a content database 105, a generation policy 107, the content classification system 110, one or more content providers 130 (illustrated as content providers 130A . . . 130N), one or more user devices 150 (illustrated as user devices 150A . . . N), one or more payment networks 160 (illustrated as payment networks 160A . . . N), and/or other components.

The natural language corpus 101 may include unannotated text having natural language text. For example, the natural language corpus 101 may include the English language Wikipedia™ corpus of data and the BookCorpus describe by Zhu et al., 2015. Other corpuses may be used as well or instead.

The charity database 103 may include a database that stores charity descriptions 141 and charity queries 142. A charity description 141 may refer to a full description of a charity 140. The full description may include information that is relevant to a mission of the charity 140 and extraneous information that may not be relevant to the mission of the charity or otherwise is not relevant for purposes of detecting similarity with content 132. A charity query 142 may refer to a description of a charity 140 that is generated based on the charity description 141 and a generation policy 107. The charity query 142 is typically, though not necessarily, smaller in size than the charity description 141 from which the charity query 142 is generated. For example, the charity query 142 will generally have less words and/or sentences than the charity description 141 from which the charity query 142 is generated. the charity database 103 may also include a stored association between a generation policy 107 used to generate a charity query 142 so that RL techniques may be applied based on feedback relating to performance of the charity query 142.

The content database 105 may include a database that stores content 132 from various content providers 130. In some examples, the content 132 analyzed by the content classification system 110 may be accessed from the content database 105 and/or may be accessed directly from a content provider 130.

A content provider 130 may provide content 132 to one or more user devices 150. The content 132 may include natural language text and/or other types of content. Examples of content 132 described herein will include articles transmitted through the communication network 111, although other types of content may be used. Examples of content providers 130 may include news sites, social media sites, sports sites, and/or other entity that transmits content 132 to user devices 150 via the communication network 111.

A charity 140 may refer to an organization whose primary mission is philanthropy or otherwise providing help to those in need. Generally, though not necessarily, a charity 140 may accept donations to fund their operations. Each charity 140 may provide a charity description 141. The charity description 141 may include natural language text that describes the charity 140. The charity description 141 may include mission statements about goals and functions of the charity 140. Oftentimes, the charity description 141 will also include information other than its core mission such date of founding, contact information, and/or other information other than its core mission.

In some examples, the content classification system 110 may apply reinforcement learning mechanisms to refine modeling of charity descriptions 141 to make them suitable for automated semantic similarity processing. For example, the content classification system 110 may include an encoder/decoder architecture that takes a full description of a charity as input and generates a "charity query" based on a generation policy and the full description. The charity query may refer to an output description that includes a subset of the natural language text of the full description of the charity, where such subset is suitable for semantic similarity comparisons with natural language text, such as a news article.

The one or more user devices 150 may include devices having processing capabilities such as a laptop computer, "smartphone" device, and/or other device generally operated by a user and programmed to receive and display content 132 from content providers 130. For example, a user device 150 may be equipped with a browser application that may browse news sites to view content 132 such as news articles. Other types of applications may be used to display other types of content 132 as well, or instead.

The one or more payment networks 160 may mediate payment requests and settlement between various parties. An example of a payment network 160 may include the Mastercard® network.

The content classification system 110 may be programmed to classify content 132 as being relevant to one or more charities based on charity queries 142 through natural language processing and machine-learning techniques. For example, the content classification system 110 may include a processor 112, a memory 114, a relevance classifier 120, a query generator 122, a reinforcement learning agent 123, a sentence tokenizer 124, an NL model 126, a similarity detector 128, and/or other components. The processor 112 may be a semiconductor-based microprocessor, a central processing unit (CPU), an application specific integrated circuit (ASIC), a field-programmable gate array (FPGA), and/or other suitable hardware device. Although the Content classification system 110 has been depicted as including a single processor 112, it should be understood that the Content classification system 110 may include multiple processors, multiple cores, or the like. The memory 114 may be an electronic, magnetic, optical, or other physical storage device that includes or stores executable instructions. The memory 114 may be, for example, Random Access memory (RAM), an Electrically Erasable Programmable Read-Only Memory (EEPROM), a storage device, an optical disc, and the like. The memory 114 may be a non-transitory machine-readable storage medium, where the term "non-transitory" does not encompass transitory propagating signals.

The relevance classifier 120, the query generator 122, the reinforcement learning agent 123, the sentence tokenizer 124, the NL model 126, and/or the similarity detector 128 may each be implemented as instructions that program the processor 112. Alternatively, or additionally, the relevance classifier 120, the query generator 122, the reinforcement learning agent 123, the sentence tokenizer 124, the NL model 126, and the similarity detector 128 may each be implemented in hardware. An example operation of the foregoing components will be described with reference to FIG. 2, which illustrates a data flow diagram 200 of an example of the content classification system 110 identifying charities 140 that are relevant to content 132 such as articles.

Figure 2:
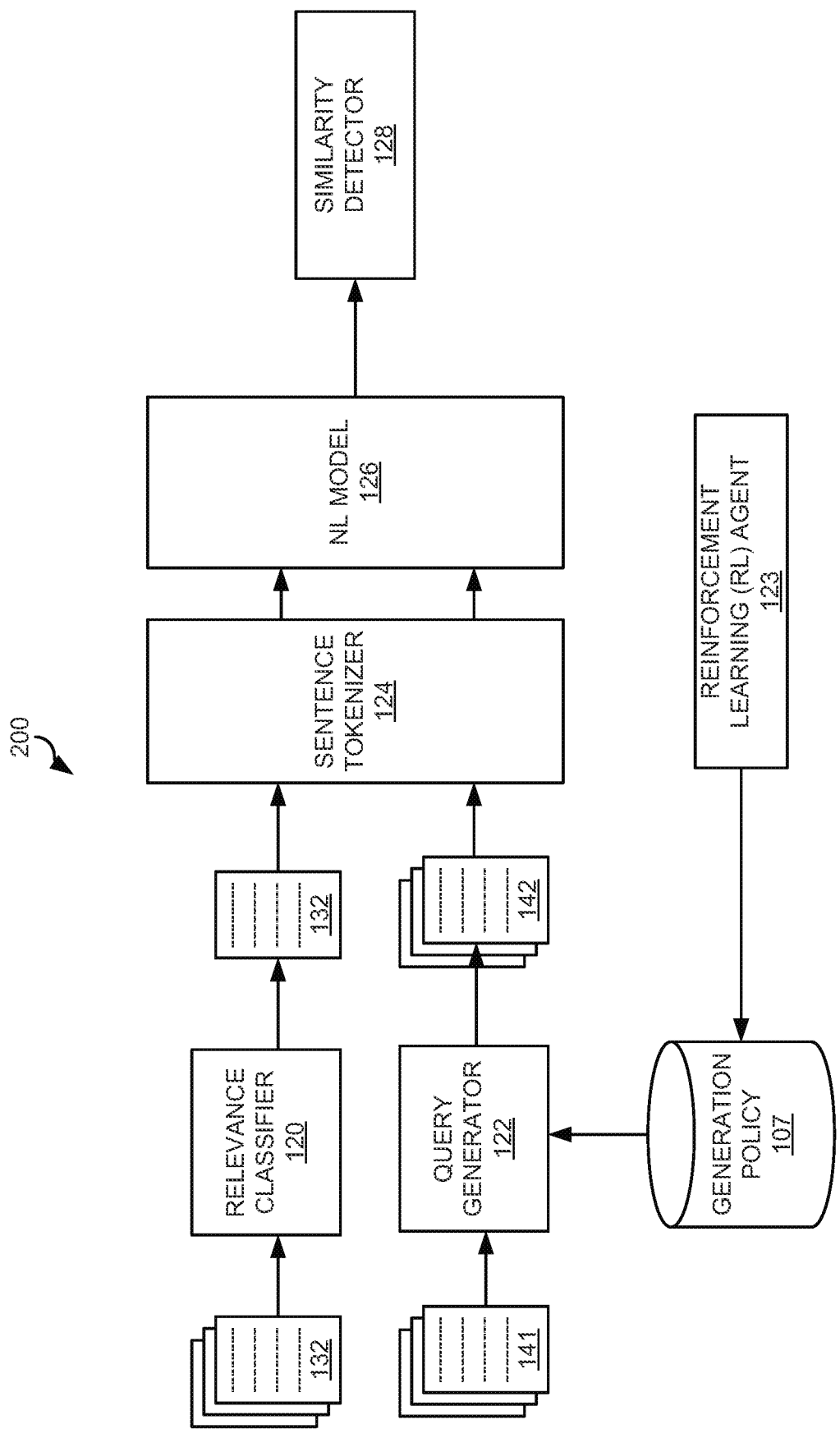
FIG. 2 illustrates a data flow diagram of an example of the content classification system identifying charities that are relevant to articles of illustrated in FIG. 1.

Referring now to FIG. 2, the relevance classifier 120 may generate a non-specific relevance classification that indicates whether a given content 132 of a content provider 130 is relevant to charities. The non-specific relevance classification therefore may not identify a particular charity 140 that is relevant to the article. Rather, the non-specific relevance classification may indicate whether or not content 132 is relevant to charities without determining whether a particular one of the charities is relevant to the content 132. For example, content 132 relating to vacation locales may be non-specifically classified as not relevant to charities while an article relating to food crises may be non-specifically classified as relevant to charities without identifying a particular charity 140.

In some examples, content 132 that are classified as being non-specifically relevant to charities may be further processed to identify one or more specific charities 140 that are relevant to the content 132. Such further processing may include sentence tokenization by the sentence tokenizer 124, natural language modeling by the NL model 126, and similarity detection by the similarity detector 128. An example of NL modeling and similarity detection is described further in FIG. 3.

Figure 4:
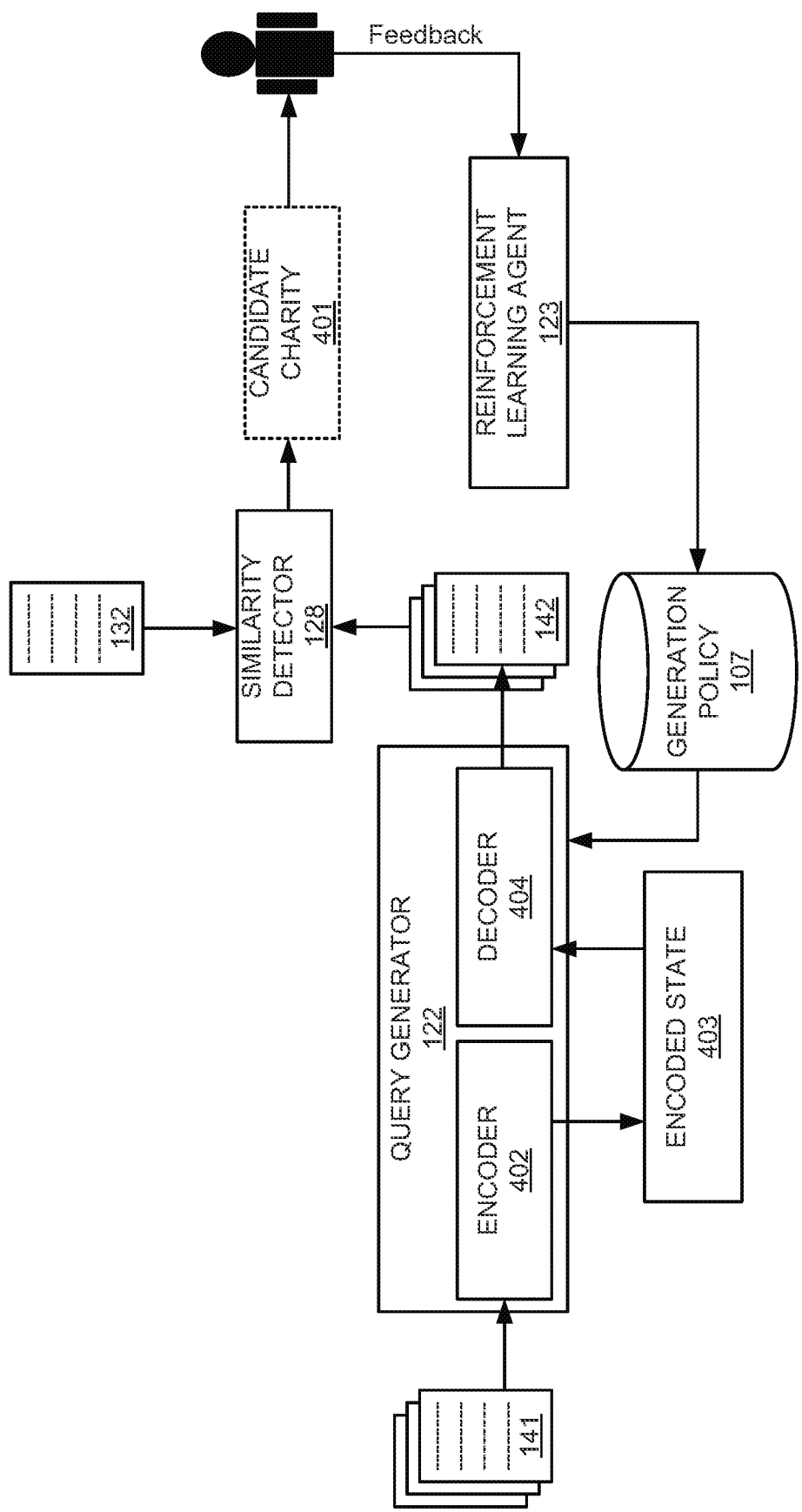
FIG. 4 illustrates a data flow diagram of an example of automatic query generation based on reinforcement learning.

In some examples, the query generator 122 may automatically generate a charity query 142 based on an input charity description 141 and the generation policy 107. In some examples, the query generator 122 may employ an encoder/decoder architecture that is refined through reinforcement learning based on feedback from the reinforcement learning agent 123. An example of query generation through reinforcement learning is illustrated in FIG. 4.

Relevance Classification

Still referring to FIG. 2, the non-specific relevance classification may include a language model for binary classification (in which two probabilities—is relevant or is not relevant—are determined) or a one-class classification (in which a single probability is determined depending on the labels and training used to train the relevance classifier 120). In these examples, the relevance classifier 120 may include a binary classifier or a one-class classifier.

The relevance classifier 120 may be trained based on training data that includes charity descriptions 141 and/or charity queries 142 from the charity database 103 and article content from the content database 105. For example, in binary classification, articles 132 deemed to be not relevant to any charity 140 may be labeled to indicate such non-relevance while articles 132 deemed to be relevant to any charity 140 may be labeled to indicate such relevance. In binary classification, each content 132 in the training data may be classified as "relevant" or "not relevant."

For one-class classification, a single label may be applied to articles 132. In these examples, the single label may correspond to a single class of articles defined as either relevant or not relevant. In one class classification, not all articles 132 will be labeled—only those articles that are either relevant or not relevant, resulting in a single classification. Thus, if the label is "relevant" some articles 132 will be labeled as "relevant" while other articles 132 will not be labeled at all.

In some examples, the output of the relevant classifier 120 may include a probability that the content 132 is and/or is not relevant charities generally. Such probability may be compared to a threshold probability to determine whether or not the content 132 is and/or is not relevant to charities generally. The threshold probability for the relevance classification (and other threshold values described herein) may be predefined. In some examples the threshold probability (and other threshold values described herein) may be initially predefined and then refined over time based on empirical observations. For example, the threshold probability may be increased if an increasing number of false positive determinations of relevance to charities is observed, such as if users provide feedback that the content 132 is not relevant to charities.

In some examples, the relevance classifier 120 may determine a charity theme associated with the content 132. Such charity theme may be based on language models such as the XLnet language model that may be used for sentiment analysis. The charity theme may be used to assist identification of particular charities that may be relevant to the content 132. For example, the charity theme may be compared to a charity theme of a charity query 142 and/or charity description 141 to refine identification of particular charities that may be relevant to the content 132.

Table 1 illustrates an example of relevance classification results (binary classification in this example) in which various content 132 were annotated as being non-specifically relevant to charities by human annotators. The content classification system 110 was then executed on the labeled datasets to determine precision, recall, and F1 score of the system-generated relevance classifications as compared to the human annotations.

|  | Precision | Recall | F1 score | No of examples |
| --- | --- | --- | --- | --- |
| No Charity | 63% | 51% | 57% | 37 |
| Charity | 75% | 83% | 79% | 164 |
| Accuracy |  |  | 71% | 101 |

Semantic Similarity

Figure 3:
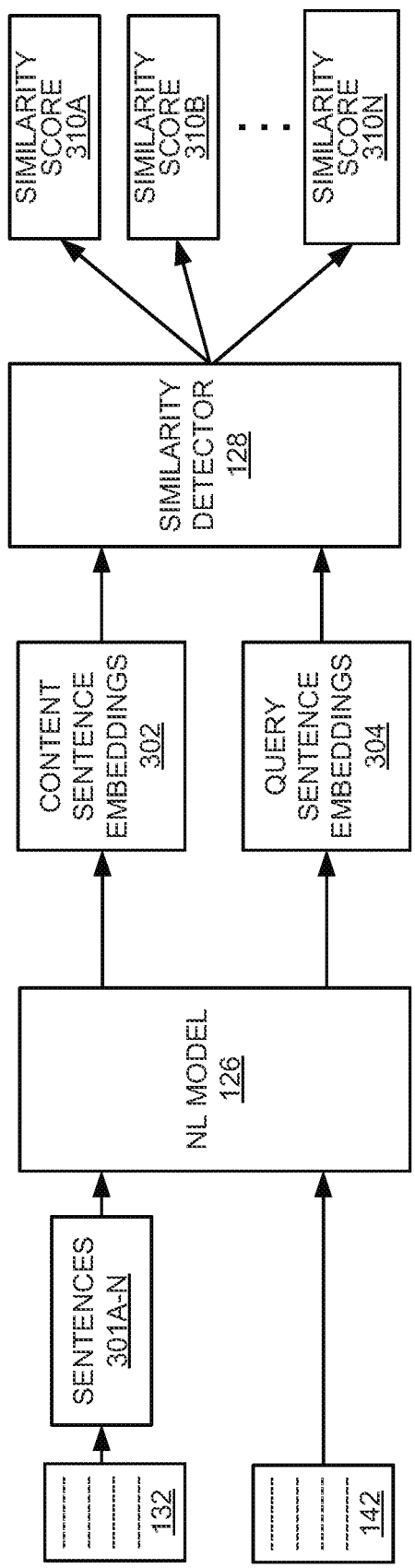
FIG. 3 illustrates a data flow diagram of an example of determining semantic textual similarity between charity descriptions and content based on a natural language model executed by the content classification system illustrated in FIG. 1.

Referring now to FIG. 3, the sentence tokenizer 124 may generate segments of text from input natural language text. Such segments may include sentences, lines of text, and/or other portions of the natural language text. For example, the sentence tokenizer 124 may identify sentences (or other segments of content) in the natural language text by splitting the natural language text into component sentences. Splitting may be based on one or more models that disambiguate sentences. These models may be trained to recognize sentences since a simple use of punctuation may not recognize sentences in text properly. For example, a period (".") may not necessarily denote the end of a sentence. One example of such a model may include the spaCy sentence segmenter, although others may be used as well or instead.

As illustrated, the sentence tokenizer 124 may generate a plurality of content sentences 301 (illustrated as content sentences 301 A ... N). The plurality of content sentences 301 may be input to the NL model 126 for natural language modeling. Generally speaking, the NL model 126 may generate a semantic representation of input sentences. A semantic representation may refer to a computational data structure that indicates words, structure (such as order) of words, or other linguistic characteristic of natural language text. In some examples, the semantic representation may include sentence embeddings. A sentence embedding may refer to a computational encoding suitable for computing by a processor, such as processor 112, in which sentences are represented by a data structure such as a vector of real numbers that may be computed by the processor.

The NL model 126 may be pretrained on the natural language corpus 101. One example of the NL model 126 may include the Robustly Optimized Bidirectional Encoder Representations from Transformers Approach (RoBERTa). Additionally, or alternatively, other language models that generate semantic representations of segments of text such as sentence embeddings may be used. For example, Doc2Vec, SentenceBERT, InferSent, the Universal Sentence Encoder, and/or other language models may be used.

The pretraining may train the NL model 126 to generate an embedding space that defines the vector values for sentences based on analyzing the word structure of a large corpus of natural language sentences. For example, the pretraining may involving learning the semantic structure of words in sentences to be able to numerically define semantic structure. For example, the sentence "I walked the dog in the morning" has a different meaning than "The dog walked on the morning paper" even though the words in the sentences are similar. By pretraining on the natural language corpus 101, the NL model 126 may be able to disambiguate the meanings of these and other sentences by analyzing the semantic structure of a large body of sentences, such as the natural language corpus 101.

The sentence embeddings may be computationally represented as an ordered array for vectorization. Each element in the array may correspond to a word in the input sentence and the array may maintain the order of the words that appear in the sentence. For example, the sentence "I walked the dog in the morning" may be initialized as an ordered array ["I", "walked", "the", "dog", "in", "the", "morning"]. Likewise, the sentence "The dog walked on the morning paper" may be initialized as an ordered array ["The", "dog", "walked", "on", "the", "morning", paper"]. The NL model 126 may generate a sentence embedding based on the ordered array by vectorizing the ordered array into real numbers based on the embedding space learned from the natural language corpus 101. For example, the sentence embedding for the sentence "I walked the dog in the morning" may be represented as [float1, float2, float3, float4, float5, float6, float7], where float 1-7 each represent a corresponding word in the sentence and is a positive or negative real number such as a floating decimal number. The NL model 126 may assign the particular float values based on the embedding space and the order of words in the sentence for which a sentence embedding is generated.

As illustrated, the NL model 126 may generate a plurality of content sentence embeddings 302 based on the plurality of content sentences 301 as described in the previous example sentence embeddings. Each content sentence embedding 302 may be a semantic representation of a corresponding content sentence 301. In some examples, the NL model 126 may generate a query sentence embedding 304 based on a charity query 142 as described in the previous example sentence embeddings. Only one charity query 142 is illustrated in FIG. 3 for clarity. However, a plurality of charity queries 142 may each be analyzed and compared to select a charity query 142 from among the plurality of charity queries based on their respective similarity to the content 132.

The similarity detector 128 may generate a similarity score 310 for each charity 140 that was analyzed by the NL model 126 (illustrated as similarity scores 310A ... N). Each similarity score 310 may indicate a level of similarity between the content 132 and a corresponding charity query 142, although only one charity query 142 is illustrated in FIG. 3 for clarity. The charity 140 whose charity query 142 has the highest level of similarity based on its similarity score 310 may be determined to be the most relevant to the content 132. In some examples, the similarity score 310 (such as the one indicating the highest similarity) may be compared to a threshold similarity value. If the similarity score 310 exceeds the threshold similarity value, the corresponding charity 140 may be deemed to be relevant to the content 132.

The similarity detector 128 may generate the similarity score 310 based on the content sentence embeddings 302 and the query sentence embedding 304 corresponding to a charity query 142. For example, the similarity detector 128 may compare the content sentence embeddings 302 to the query sentence embedding 304 to determine a quantitative similarity between the sentence embeddings. In particular examples, the similarity detector 128 may apply a cosine function, a Euclidean distance function, a dot product function, and/or other function that may determine a similarity score that indicates a similarity between an content sentence embedding 302 and a query sentence embedding 304. It should be noted that in some examples, there may exist multiple (not just one) query sentence embedding 304 for a given charity query 142. In either case, the similarity detector 128 may generate a sentence similarity score for each content sentence embeddings 302 and query sentence embedding(s) 304 pair. In some examples, the overall similarity score 310 may be based on an aggregate (such as sum, product, average, mean, etc.) of some or all sentence similarity scores, a highest one of the sentence similarity scores, and/or other metric.

Table 2 includes an example of content 132 and similarity scores 310 that each indicate similarity to charities 140 based on the natural language modeling described herein. The NL model 126 may generate a sentence embedding of the example sentence (and other sentences) of the content 132. For example, an ordered array of words may be generated and the NL model may generate a vector of real number values corresponding to the ordered array of words according to the embedding space learned from the natural language corpus 101. The NL model 126 may likewise generate an embedding for each charity query 142A . . . N. The similarity detector 128 may apply a similarity function that quantifies similarity between vectors to generate similarity scores 310A . . . N corresponding to each charity query 142A . . . N.

| Example Title of Content 132 | Example Sentence from Content 132 | Example Charity 140 | Example Charity Query 142A . . . N | Example Similarity Score 310 |
|---|---|---|---|---|
| How You Can Help Victims of Hurricanes | Poverty-stricken countries may be particularly vulnerable to widespread humanitarian crises such as loss of life to significant property that hurricanes can cause. | Charity 140A | We provide natural disaster relief to countries throughout the world. | 0.71 |
| | | Charity 140B | We are dedicated to finding a cure for cancer. | 0.10 |
| | | Charity 140N | We aim to eliminate worldwide food insecurity. | 0.23 |

In some examples, each charity query 142 may be derived from a charity description 141. For example, the query generator 122 may generate a charity query 142 based on a charity description 141 of the charity 140 and the generation policy 107. The generation policy 107 may be revised based on reinforcement learning in which the RL agent 123 may provide feedback on whether or not the charity query 142 resulted in a positive result. A positive result may refer to an indication that the charity 140 corresponding to the charity query 142 was relevant to the content 132. The positive indication may include a donation being made to the charity 140 in connection with the content 132, user-provided feedback that the charity 140 was relevant to the content 132, and/or other indication that the charity 140 is relevant to the content 132. On the other hand, a negative result may include no donation being made to the charity 140 in connection with the content 132, user-provided feedback that the charity 140 was not relevant to the content 132, and/or other negative indication. An example of generating charity queries 142 based on reinforcement learning is described in more detail with reference to FIG. 4.

Generating Charity Queries Based on Reinforcement Learning

Referring now to FIG. 4, the query generator 122 may generate a charity query 142 based on a charity description 141 of a charity 140, the generation policy 107, and reinforcement learning that updates the generation policy 107 based on feedback from the RL agent 123. The generation policy 107 may specify an action to take in light of a current state of processing the charity description 141. For example, the query generator 122 may perform extractive summarization of the charity description 141 in which the action may be to identify or rank a sentence as representative of the charity description 141. In other words, in extractive summarization, the generation policy 107 may direct the selection of one or more sentences from the charity description 141 to include in the charity query 142.

In another example, the query generator 122 may perform abstractive summarization of the charity description 141 in which the action may be to identify or rank phrases or sentences that do not appear in the charity description 141 but represent a summary of the charity description 141. In other words, in abstractive summarization, the generation policy 107 may direct the selection of one or more phrases or sentences that do not appear in the charity description 141 but nevertheless summarize the charity description 141.

In some examples, the query generator 122 may employ an encoder/decoder architecture. An example of such an encoder/decoder architecture may include the sequence-to-sequence (seq2seq) model. As illustrated, the query generator 122 may include an encoder 402 and a decoder 404. The encoder 402 may access each of the sentences of the charity description 141 and generates an encoded state 403 based on the charity description 141. The encoded state 403 may be of a fixed shape. Thus, the encoder 402 may take as input a charity description 141, which may be variable shape, to a fixed shape encoded state 403. In some examples, the encoded state 403 may represent an intermediate description based on the charity description 141. Such intermediate description may be further processed by the decoder 404 to generate the charity query 142.

For example, the decoder 404 may take as input the output of the encoder 402. In this example, the decoder 404 may take as input the encoded state 403 and generate the charity query 142. Such generation may include taking actions encoded in the generation policy 107 depending on the encoded state 403.

The similarity detector 128 may identify one or more candidate charities 401 that are relevant to the content 132. The candidate charities 401 may be transmitted to the user, such as via the user interface 600 illustrated in FIG. 6.

Figure 5:
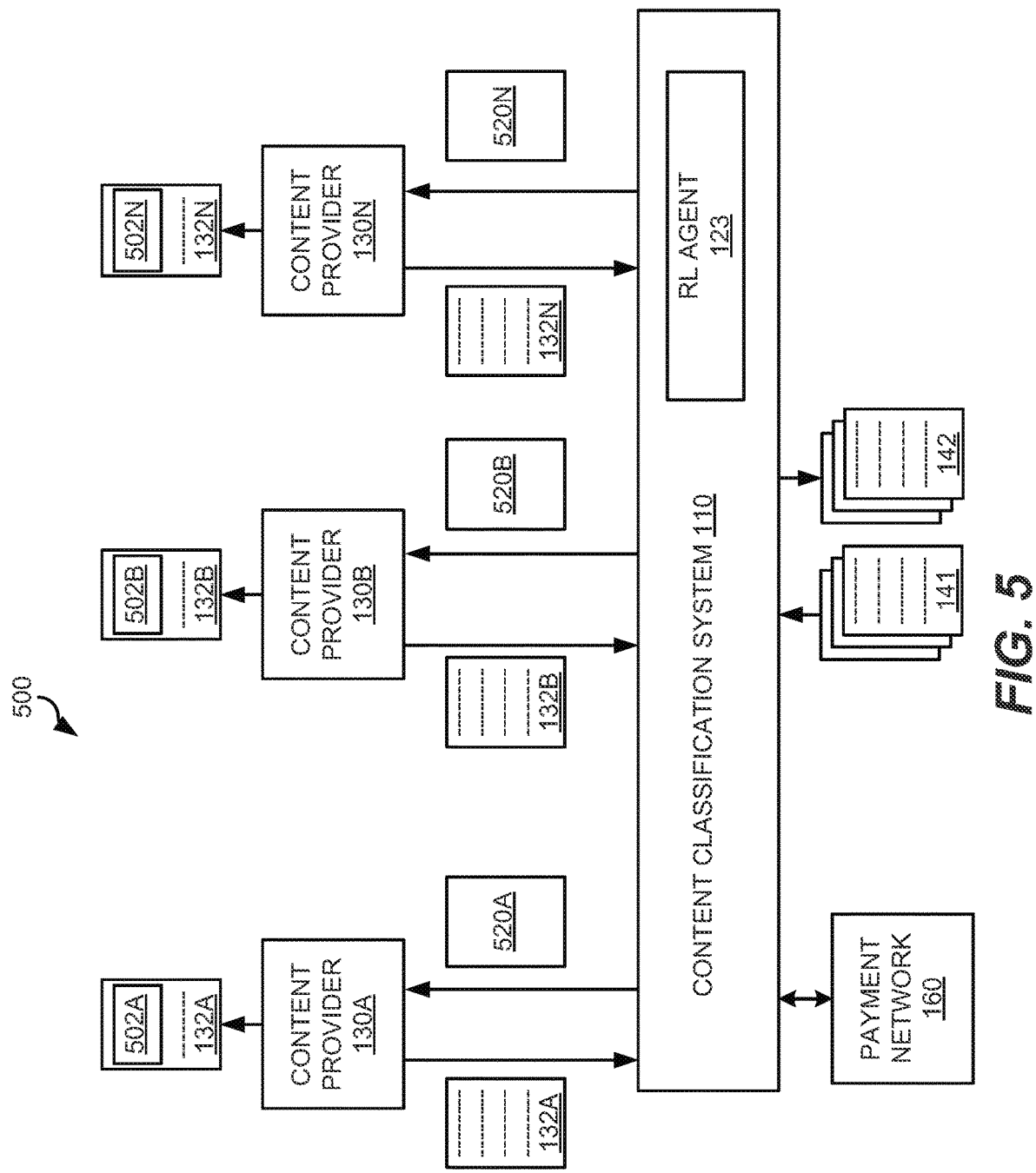
FIG. 5 illustrates an example operation of the system environment illustrated in FIG. 1 in which one or more charities relevant to content are identified and transmitted via a callback network interface to facilitate donations to the one or more charities and reinforcement learning for generating charity queries to improve charity identifications.
Figure 6:
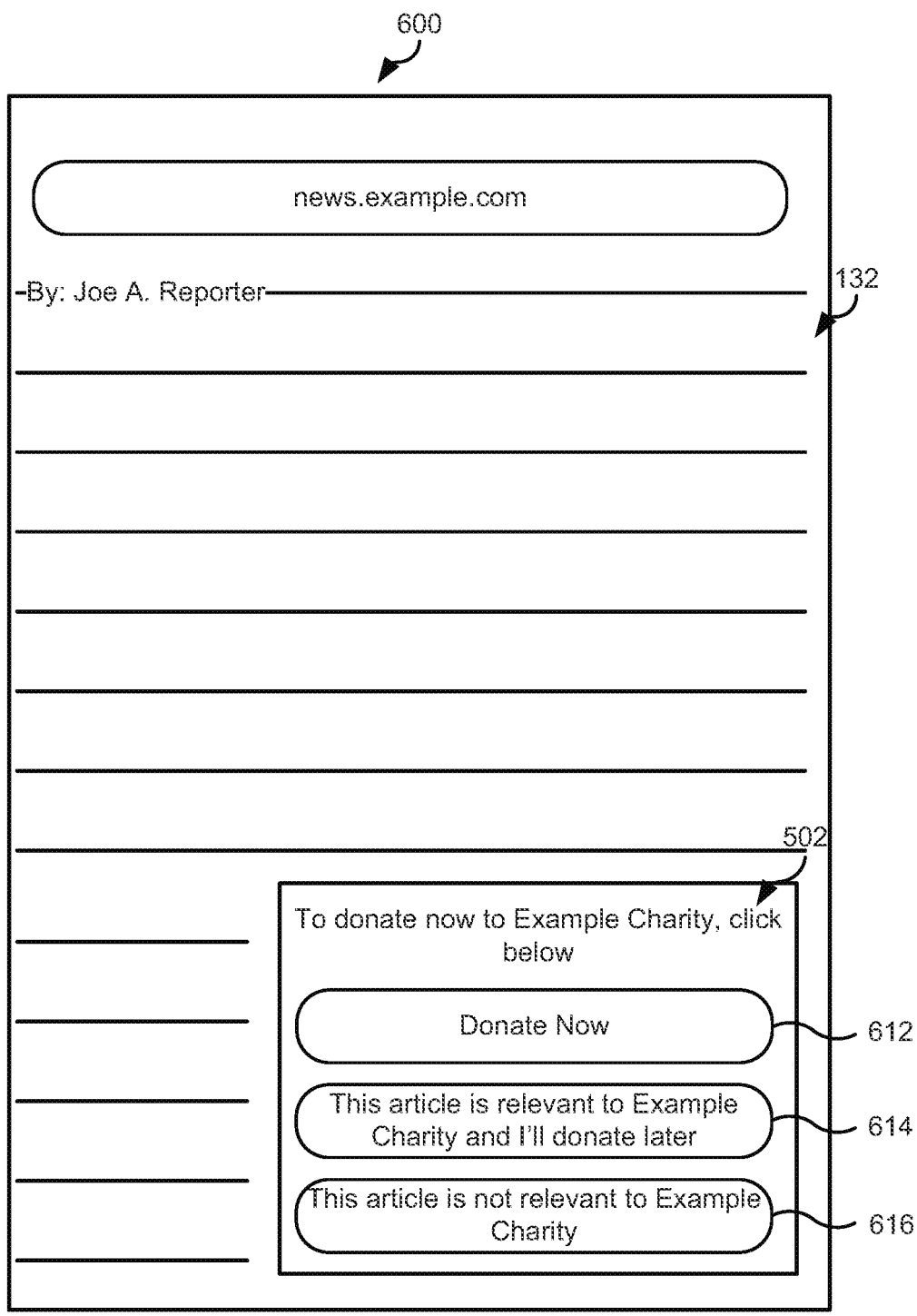
FIG. 6 illustrates an example of a user interface that includes content for which the charity was recommended and the callback network interface.

The RL agent 123 may receive feedback, such as feedback based on the callback network interface 502 illustrated in FIGS. 5 and 6. The feedback may include an identifier that identifies the query generation event that resulted in the query generator 122 generated the charity query 142. For example, when a charity query 142 is generated from a charity description 141, the content classification system 110 may record such query generation event and the identifier in a database, such as the charity database 103. When feedback is received, the RL agent 123 may look-up the query generation event based on the identifier to identify the generation policy 107 used to generate the charity query 142. In this manner, the feedback may be used to refine the generation policy 107. Positive feedback may reinforce the actions to be taken while negative feedback may result in a different action to take. For example, if the generation policy 107 included an action to select a first sentence in a paragraph based on the encoded state 403, positive feedback may result in the action continuing to be taken. On the other hand, negative feedback may result in weight the action potentially no longer being taken. In other words, the feedback may act as a positive or negative weight on the actions that were taken based on the generation policy 107 when the charity query 142 was generated. In this manner, positive feedback may reinforce actions taken while negative feedback may result in different actions being taken to generate the charity query 142.

Table 3 illustrates an example of charity identifications compared to content 132 annotated by humans with tags indicating relevance to one or more charities 140. In Table 3, "All correct" means predicted tags match with the provided tags, "Added extra tags" means predicted tags which include the actual tag in and some extra tags, "Partial capture" means predicted only a part of the provided tags, and "Wrong tags" means predicted entirely different from the provided tags.

| Tag | No of cases | % cases |
| --- | --- | --- |
| All correct | 36 | 36% |
| Added extra tags | 35 | 35% |
| Partial capture | 1 | 1% |
| Wrong tags | 29 | 29% |
| Total | 101 | |

FIG. 5 illustrates an example operation 500 of the system environment 100 illustrated in FIG. 1 in which one or more charities 140 relevant to content 132 are identified and transmitted via a callback network interface 502 to facilitate donations to the one or more charities and reinforcement learning for generating charity queries 142 to improve charity identifications. The content classification system 110 may access content 132 from content providers 130. For each content 132, the content classification system 110 may identify one or more specific charities 140 that may be relevant to the content 132.

The content classification system 110 may transmit an identification of the identified charity 140 for inclusion with the content 132. For example, the content classification system 110 may generate a callback network interface 502 for each content 132 for which one or more charities 140 have been identified. The callback network interface 502 may include client-executable code such as JAVASCRIPT that provides an ability to initiate a donation to the one or more charities. In some examples, the content classification system 110 may transmit the callback network interface 502 to the content provider 130, which may provide the content 132 and the callback network interface 502 to a user device 150. It should be noted that the callback network interface 502 may instead include an identification of the charity 140 identified as relevant to the content 132 and the content provider 130 may handle the details of providing an interface for donating to the charity 140.

A user that receives the content 132 (such as through a client browser or other application) may be able to donate to and/or provide feedback relating to the one or more charities 140 identified in the callback network interface 502. Such feedback may be monitored by the RL agent 123, which may update the generation policy 107 to facilitate reinforcement learning that improves the way in which charity queries 142 are generated from charity descriptions 141.

FIG. 6 illustrates an example of a user interface 600 that includes content 132 for which a charity 140 was recommended and the callback network interface 502. In the illustrated example, the content 132 may include a news article presented through a client application, such as a web browser. The callback network interface 502 may include code or other instructions that includes a network address at which a donation may be initiated. For example, the network address may include an endpoint at which the RL agent 123 illustrated in previous figures may listen for or otherwise access responses from the callback network interface 502. The RL agent 123 in these examples may facilitate reinforcement learning and forwarding a request to make a donation to the charity 140 that was identified to be relevant to the content 132.

In some examples, the callback network interface 502 may include a donation trigger 612. The donation trigger 612, when selected by a user, may trigger a request to donate to the charity 140. Such donation trigger 612 may be monitored by the RL agent 123 and may be indicated as positive feedback that the charity 140 was relevant to the content 132. The donation trigger 612, when selected, may cause a payment interface to be transmitted to the user device 150. The payment interface may be used to obtain (through input by the user and/or automatically obtained) payment information for processing by the payment network 160. In some examples, the positive feedback may be entered by the RL agent 123 only when a donation is actually completed via the payment network 160.

In some examples, the callback network interface 502 may facilitate feedback even without express donations. For example, the callback network interface 502 may include a positive feedback indicator 614 and a negative feedback indicator 616. When selected, the positive feedback indicator 614 may transmit an indication to the RL agent 123 that the charity 140 was relevant to the content 132. On the other hand, when selected, the negative feedback indicator 616 may transmit an indication to the RL agent 123 that the charity 140 was not relevant to the content 132. In either case, in some examples, positive feedback based on actual donations may be weighted greater than feedback based on the positive feedback indicator 614 or negative feedback indicator 616.

Figure 7:
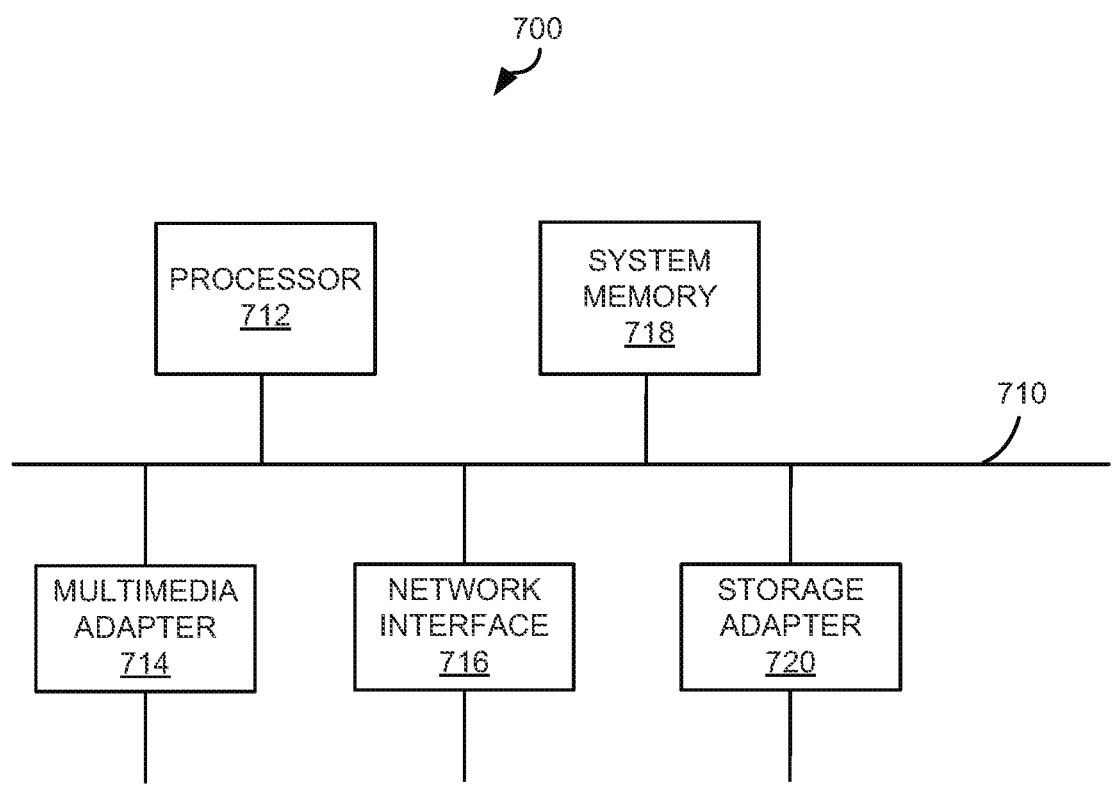
FIG. 7 illustrates an example of a computer system that may be implemented by devices illustrated in FIG. 1.

FIG. 7 illustrates an example of a computer system that may be implemented by devices illustrated in FIG. 1. Various ones of the devices of system environment 100 may be implemented based on some or all of the computer system 700. The computer system 700 may include, among other things, an interconnect 710, a processor 712, a multimedia adapter 714, a network interface 716, a system memory 718, and a storage adapter 720.

The interconnect 710 may interconnect various subsystems, elements, and/or components of the computer system 700. As shown, the interconnect 710 may be an abstraction that may represent any one or more separate physical buses, point-to-point connections, or both, connected by appropriate bridges, adapters, or controllers. In some examples, the interconnect 710 may include a system bus, a peripheral component interconnect (PCI) bus or PCI-Express bus, a HyperTransport or industry standard architecture (ISA)) bus, a small computer system interface (SCSI) bus, a universal serial bus (USB), IIC (I2C) bus, or an Institute of Electrical and Electronics Engineers (IEEE) standard 1384 bus, or "firewire," or other similar interconnection element.

In some examples, the interconnect 710 may allow data communication between the processor 712 and system memory 718, which may include read-only memory (ROM) or flash memory (neither shown), and random-access memory (RAM) (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

The processor 712 may control operations of the computer system 700. In some examples, the processor 712 may do so by executing instructions such as software or firmware stored in system memory 718 or other data via the storage adapter 720. In some examples, the processor 712 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter 714 may connect to various multimedia elements or peripherals. These may include devices associated with visual (e.g., video card or display), audio (e.g., sound card or speakers), and/or various input/output interfaces (e.g., mouse, keyboard, touchscreen).

The network interface 716 may provide the computer system 700 with an ability to communicate with a variety of remove devices over a network such as the communication network 111 illustrated in FIG. 1. The network interface 716 may include, for example, an Ethernet adapter, a Fibre Channel adapter, and/or other wired- or wireless-enabled adapter. The network interface 716 may provide a direct or indirect connection from one network element to another, and facilitate communication and between various network elements.

The storage adapter 720 may connect to a standard computer readable medium for storage and/or retrieval of information, such as a fixed disk drive (internal or external).

Other devices, components, elements, or subsystems (not illustrated) may be connected in a similar manner to the interconnect 710 or via a network such as the communication network 111. The devices and subsystems can be interconnected in different ways from that shown in FIG. 7. Instructions to implement various examples and implementations described herein may be stored in computer-readable storage media such as one or more of system memory 718 or other storage. Instructions to implement the present disclosure may also be received via one or more interfaces and stored in memory. The operating system provided on computer system 700 may be MS-DOS®, MS-WINDOWS®, OS/2®, OS X®, IOS®, ANDROID®, UNIX®, Linux®, or another operating system.

Figure 8:
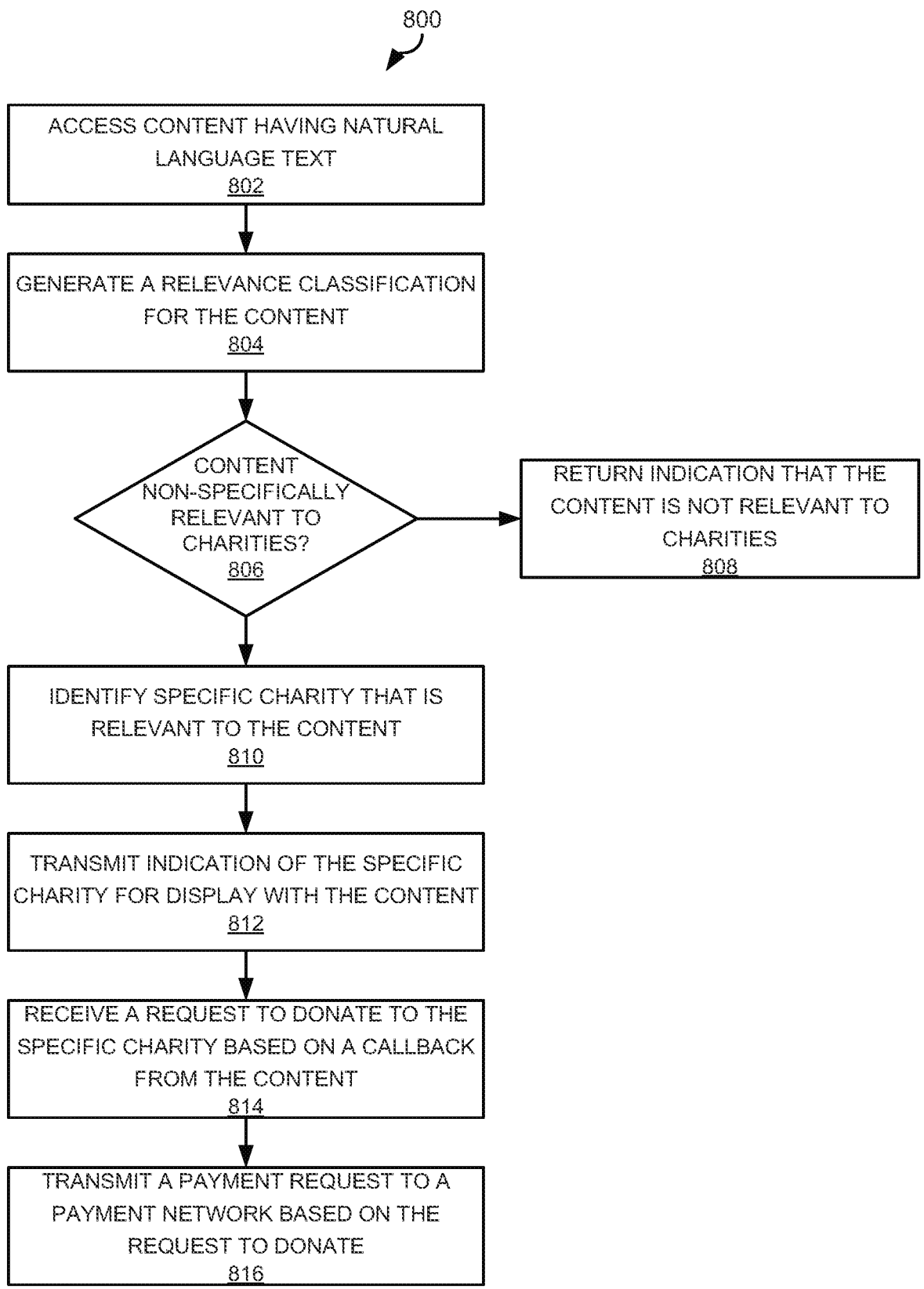
FIG. 8 illustrates an example of a method of determining whether an article is non-specifically relevant to charities based on a relevance classifier and if non-specifically relevant to charities, identifying a specific charity that is relevant to the article based on a natural language model.

FIG. 8 illustrates an example of a method 800 of determining whether an article is non-specifically relevant to charities based on a relevance classifier and if non-specifically relevant to charities, identifying a specific charity that is relevant to the article based on a natural language model. At 802, the method 800 may include accessing content, such as content 132, having natural language text. At 804, the method 800 may include generating a relevance classification for the content based on a relevance classifier, such as the relevance classifier 120. At 806, the method 800 may include determining whether the content is non-specifically relevant to charities based on the relevance classification. At 808, if the content is not non-specifically relevant to charities, the method 800 may include transmitting an indication of such non-specific relevance. For example, the indication may be transmitted to a content provider 130 that provides the content.

At 810, if the content is non-specifically relevant to charities, the method 800 may include identifying a specific charity, such as a charity 140, that is relevant to the article. The identification may be performed based on the method 900 illustrated in FIG. 9. At 812, the method 800 may include transmitting an indication of the specific charity, such as to the content provider 130, for display with the content. For example, the indication of the specific charity may include a callback to make a donation to the specific charity. The content provider 130 may provide the content along with the callback. An example of the content with callback is illustrated in FIG. 6. At 814, the method 800 may include receiving a request to donate to the specific charity based on the callback. At 816, the method 800 may include obtaining payment information (such as payment account number) and transmitting a payment request to a payment network, such as payment network 160, to process a payment to facilitate the donation.

Figure 9:
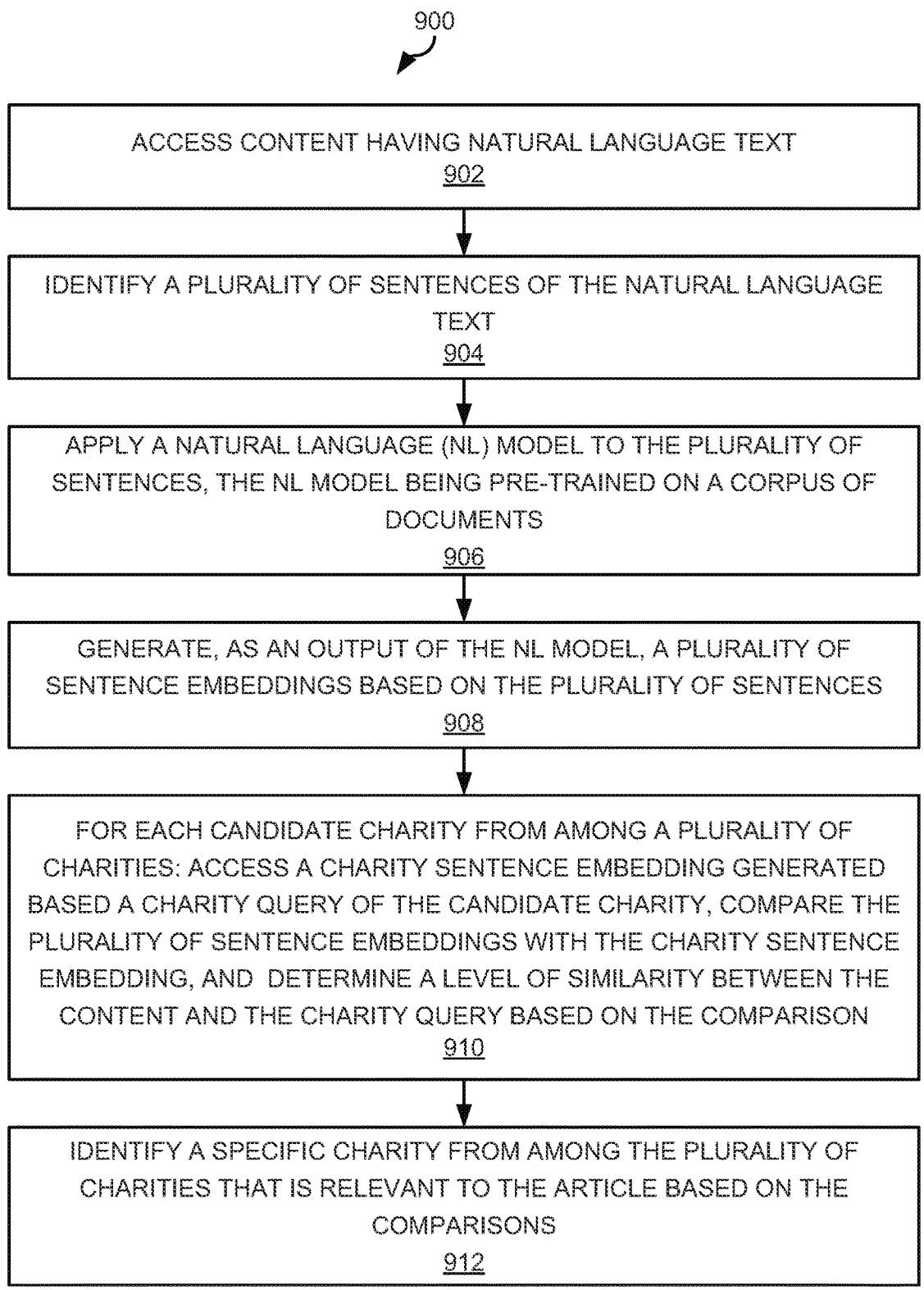
FIG. 9 illustrates an example of a method of identifying a charity that is relevant to an article based on natural language modeling.

FIG. 9 illustrates an example of a method 900 of identifying a charity that is relevant to an article based on NL modeling. At 902, the method 900 may include accessing content, such as content 132, comprising natural language text. At 904, the method 900 may include identifying, via a sentence tokenizer, a plurality of sentences of the natural language text. At 906, the method 900 may include applying an NL model, such as the NL model 126, to the plurality of sentences, the NL model being pre-trained on a corpus of documents, such as the natural language corpus 101. At 908, the method 900 may include generating, as an output of the NL model, a plurality of content sentence embeddings based on the plurality of sentences.

At 910, the method 900 may include for each candidate charity from among a plurality of charities: accessing a charity sentence embedding generated based a charity query of the candidate charity, comparing the plurality of content sentence embeddings with the charity sentence embedding, and determining a level of similarity between the content and the charity query based on the comparison. At 912, the method 900 may include selecting a specific charity from among the plurality of charities that is relevant to the article based on the determined levels of similarity.

Figure 10:
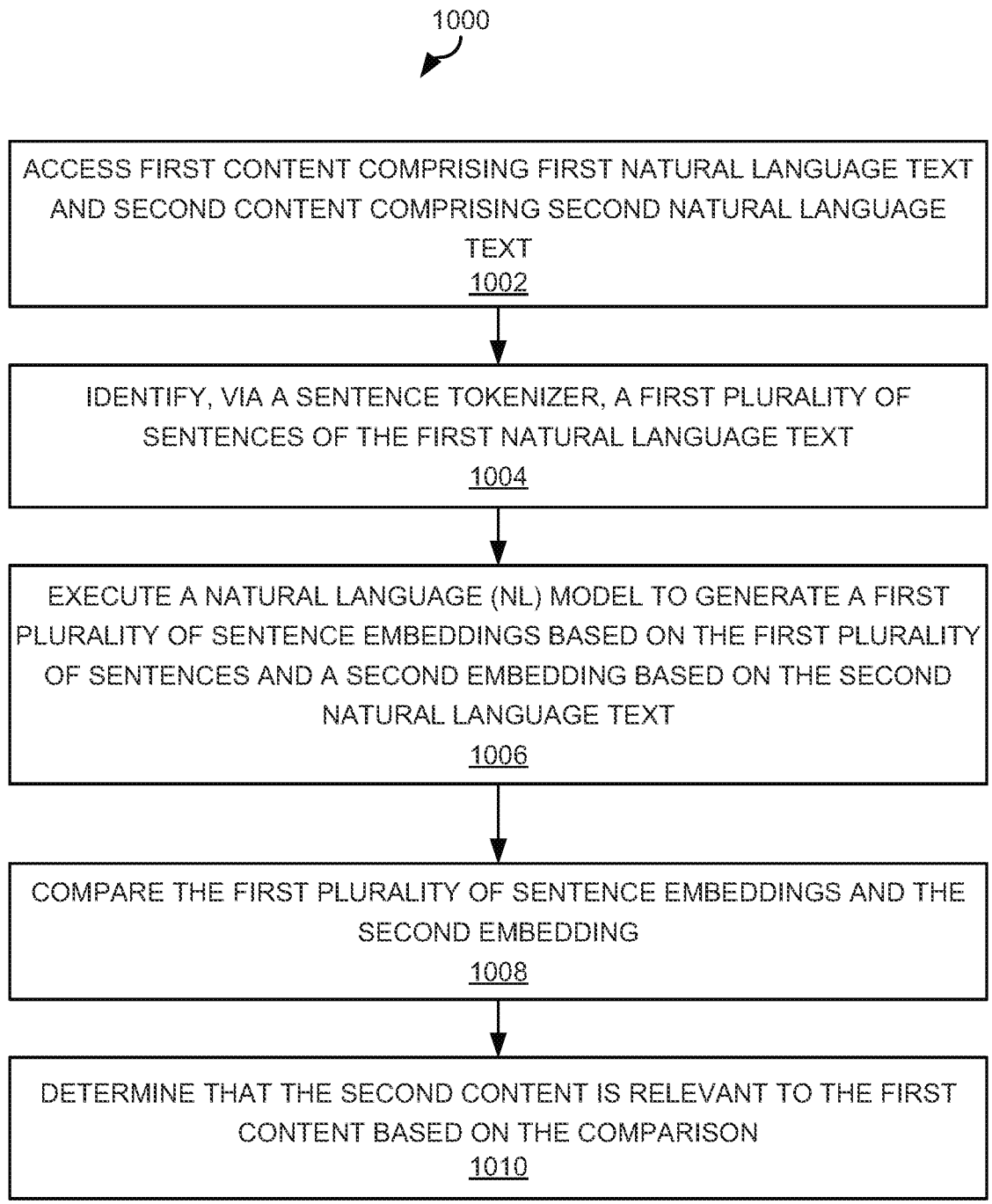
FIG. 10 illustrates an example of a method of identifying relevance between different content each having natural language text based on natural language modeling.

FIG. 10 illustrates an example of a method 1000 of identifying relevance between different content each having natural language text based on NL modeling. At 1002, the method 1000 may include accessing first content comprising first natural language text and second content comprising second natural language text. The first content may include articles. The second content may include a description of a charity, a product, service, or other subject matter that may be relevant to the first content. If relevant to the first content, the second content may be placed alongside the first content. For example, the first content may be an article about a natural disaster may be relevant to a charity that provides assistance to natural disaster survivors. The second content may include a charity query that is based on a full description of the charity. In another examples, the first content may include subject matter relating to golf that may be relevant to golfing equipment. The second content may include a sports equipment query that is based on a description of a sports equipment retailer.

At 1004, the method 1000 may include identifying, via a sentence tokenizer, a first plurality of sentences of the first natural language text. At 1006, the method 1000 may include executing a natural language (NL) model to generate a first plurality of sentence embeddings based on the first plurality of sentences and a second embedding based on the second natural language text. At 1008, the method 1000 may include comparing the first plurality of sentence embeddings and the second embedding. At 1010, the method 1000 may include determining that the second content is relevant to the first content based on the comparison. In the example natural disaster article, the article may be presented with a link to donate to the charity. In the example sports content, the sports content may be presented with a link to an advertisement for the sports retailer.

It should be noted that AI and machine-learning as generally described herein throughout may refer to various types of systems that involve training, validating, and using intelligent behavior in computers. For example, broadly speaking, AI may include systems, programmed by computer instructions, that is improved to act "intelligently" in a manner that is able to learn from observations. Machine-learning may include particular computational training of computer systems so that computers may learn from observed data to alter their behavior. Machine-learning may include deep learning techniques, which may involve training a computer based on labels. In various examples, the labels may include labels of what constitutes "relevance to charities" such as to train the relevance classifier 120.

Throughout the disclosure, the terms "a" and "an" may be intended to denote at least one of a particular element. As used herein, the term "includes" means includes but not limited to, the term "including" means including but not limited to. The term "based on" means based at least in part on. In the Figures, the use of the letter "N" to denote plurality in reference symbols is not intended to refer to a particular number.

The databases described herein may be, include, or interface to, for example, an Oracle™ relational database sold commercially by Oracle Corporation. Other databases, such as Informix™, DB2 or other data storage, including file-based, or query formats, platforms, or resources such as OLAP (On Line Analytical Processing), SQL (Structured Query Language), a SAN (storage area network). Microsoft Access™ or others may also be used, incorporated, or accessed. The database may comprise one or more such databases that reside in one or more physical devices and in one or more physical locations. The database may include cloud-based storage solutions. The database may store a plurality of types of data and/or files and associated data or file descriptions, administrative information, or any other data. The various databases may store predefined and/or customized data described herein.

The components of the system environment 100 illustrated in FIG. 1 may be connected to one another via a communication network 111, which may include the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network through which system environment 100 components may communicate.

The systems and processes are not limited to the specific embodiments described herein. In addition, components of each system and each process can be practiced independent and separate from other components and processes described herein. Each component and process also can be used in combination with other assembly packages and processes. The flow charts and descriptions thereof herein should not be understood to prescribe a fixed order of performing the method blocks described therein. Rather the method blocks may be performed in any order that is practicable including simultaneous performance of at least some method blocks. Furthermore, each of the methods may be performed by one or more of the system components illustrated in the figures.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. Example computer-readable media may be, but are not limited to, a flash memory drive, digital versatile disc (DVD), compact disc (CD), fixed (hard) drive, diskette, optical disk, magnetic tape, semiconductor memory such as read-only memory (ROM), and/or any transmitting/receiving medium such as the Internet or other communication network or link. By way of example and not limitation, computer-readable media comprise computer-readable storage media and communication media. Computer-readable storage media are tangible and non-transitory and store information such as computer-readable instructions, data structures, program modules, and other data. Communication media, in contrast, typically embody computer-readable instructions, data structures, program modules, or other data in a transitory modulated signal such as a carrier wave or other transport mechanism and include any information delivery media. Combinations of any of the above are also included in the scope of computer-readable media. The article of manufacture containing the computer code may be made and/or used by executing the code directly from one medium, by copying the code from one medium to another medium, or by transmitting the code over a network.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system of applying machine-learning to determine linguistic similarity between descriptions of one or more charities and an article to identify a charity that is relevant to the article, comprising:
a processor programmed to:
access content comprising natural language text;
identify, via a sentence tokenizer, a plurality of sentences of the natural language text;

apply a natural language (NL) model to the plurality of sentences, the NL model being pre-trained on a corpus of documents;

generate, as an output of the NL model, a plurality of content sentence embeddings based on the plurality of sentences;

for each candidate charity from among a plurality of charities:
  i) access a charity sentence embedding generated based a charity query of the candidate charity,
  ii) compare the plurality of content sentence embeddings with the charity sentence embedding, and
  iii) determine a level of similarity between the content and the charity query based on the comparison; and select a specific charity from among the plurality of charities that is relevant to the article based on the determined levels of similarity.

2. The system of claim 1, wherein to determine the level of similarity between the content and the charity query, for each candidate charity, the processor is further programmed to:
  generate a similarity score for the candidate charity based on the comparison, the similarity score representing the level of similarity between the content and the charity query.

3. The system of claim 2, wherein to generate the similarity score, the processor is further programmed to:
  for each content sentence embedding of the plurality of content sentence embeddings:
    generate a sentence similarity score between the content sentence embedding and the charity sentence embedding, and
    determine whether the sentence similarity score exceeds a sentence similarity threshold value; and
  generate the similarity score based on sentence similarity scores that exceed the sentence similarity threshold value.

4. The system of claim 3, wherein to generate the sentence similarity score, the processor is further programmed to:
  apply a cosine function to the content sentence embedding and the charity sentence embedding.

5. The system of claim 1, wherein the content is filtered as being non-specifically relevant to charities based on a relevance classifier, and wherein to filter the content, the processor is further programmed to:
  generate, as an output of the relevance classifier, a charity score representing a probability that the content is non-specifically relevant to charities;
  compare the charity score to a threshold charity score; and
  determine that the content is non-specifically relevant to charities based on the comparison.

6. The system of claim 5, wherein the processor is further programmed to:
  identify a charity theme based on the relevance classifier, wherein selection of the specific charity is based further on the charity theme.

7. The system of claim 1, wherein for each candidate charity, the charity query is generated from a full description of the candidate charity, and wherein to generate the charity query from the full description, the processor is programmed to:
  apply a language processing model to the full description, the language processing model using a generation policy to generate the charity query.

8. The system of claim 7, wherein the processor is further programmed to:
  transmit a recommendation to donate to the specific charity;
  receive feedback indicating whether the specific charity was relevant to the content; and
  update the generation policy based on the feedback.

9. The system of claim 1, wherein the processor is further programmed to:
  transmit a recommendation to donate to the specific charity and a link to facilitate payment for a donation;
  receive a request to make the donation via the link;
  obtain payment information for the donation; and
  transmit a payment request to a payment network based on the payment information.

10. The system of claim 1, wherein the charity sentence embedding comprises a plurality of charity sentence embeddings, and wherein for each candidate charity, the processor is programmed to compare each charity sentence embedding to each content sentence embedding.

11. A method of applying machine-learning to determine linguistic similarity between descriptions of one or more charities and an article to identify a charity that is relevant to the article, comprising:
  accessing, by a processor, content comprising natural language text;
  identifying, by the processor, via a sentence tokenizer, a plurality of sentences of the natural language text;
  applying, by the processor, a natural language (NL) model to the plurality of sentences, the NL model being pre-trained on a corpus of documents;
  generating, by the processor, as an output of the NL model, a plurality of content sentence embeddings based on the plurality of sentences;
  for each candidate charity from among a plurality of charities:
    i) accessing a charity sentence embedding generated based a charity query of the candidate charity,
    ii) comparing the plurality of content sentence embeddings with the charity sentence embedding, and
    iii) determining a level of similarity between the content and the charity query based on the comparison; and
  selecting, by the processor, a specific charity from among the plurality of charities that is relevant to the article based on the determined levels of similarity.

12. The method of claim 11, wherein determining the level of similarity between the content and the charity query comprises, for each candidate charity:
  generating a similarity score for the candidate charity based on the comparison, the similarity score representing the level of similarity between the content and the charity query.

13. The method of claim 12, wherein generating the similarity score comprises:
  for each content sentence embedding of the plurality of content sentence embeddings:
    generating a sentence similarity score between the content sentence embedding and the charity sentence embedding, and
    determining whether the sentence similarity score exceeds a sentence similarity threshold value; and
  generating the similarity score based on sentence similarity scores that exceed the sentence similarity threshold value.

14. The method of claim 13, wherein generating the sentence similarity score comprises:
  applying a cosine function to the content sentence embedding and the charity sentence embedding.

15. The method of claim 11, wherein the content is filtered as being non-specifically relevant to charities based on a relevance classifier, and wherein filtering the content comprises:
generating, as an output of the relevance classifier, a charity score representing a probability that the content is non-specifically relevant to charities;
comparing the charity score to a threshold charity score; and
determining that the content is non-specifically relevant to charities based on the comparison.

16. The method of claim 15, further comprising:
identifying a charity theme based on the relevance classifier, wherein selection of the specific charity is based further on the charity theme.

17. The method of claim 11, wherein for each candidate charity, the charity query is generated from a full description of the candidate charity, and wherein generating the charity query from the full description comprises:
applying a language processing model to the full description, the language processing model using a generation policy to generate the charity query.

18. The method of claim 17, further comprising:
transmitting a recommendation to donate to the specific charity;
receiving feedback indicating whether the specific charity was relevant to the content; and
updating the generation policy based on the feedback.

19. The method of claim 11, further comprising:
transmitting a recommendation to donate to the specific charity and a link to facilitate payment for a donation;
receiving a request to make the donation via the link;
obtaining payment information for the donation; and
transmitting a payment request to a payment network based on the payment information.

20. The method of claim 11, wherein the charity sentence embedding comprises a plurality of charity sentence embeddings, the method further comprising, for each candidate charity
comparing each charity sentence embedding to each content sentence embedding.

* * * * *